(12) United States Patent
Ohyama et al.

(10) Patent No.: US 7,002,623 B1
(45) Date of Patent: Feb. 21, 2006

(54) IMAGE PROCESSING APPARATUS FOR CORRECTING A COLOR AND TEXTURE OF AN IMAGE AND DISPLAYING THE CORRECTED IMAGE

(75) Inventors: Nagaaki Ohyama, Kawasaki (JP); Masahiro Yamaguchi, Yokohama (JP); Takashi Obi, Yokohama (JP); Masaru Tsuchida, Yokohama (JP); Kensuke Ishii, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/391,943

(22) Filed: Sep. 8, 1999

(30) Foreign Application Priority Data

Sep. 8, 1998 (JP) ................................. 10-254034

(51) Int. Cl.
*H04N 9/73* (2006.01)
(52) U.S. Cl. .................... 348/225.1; 348/142; 348/602
(58) Field of Classification Search ............ 348/223.1, 348/224.1, 225.1, 602, 603, 142, 50; 345/426, 345/585
See application file for complete search history.

(56) References Cited

U.S. PATENT DOCUMENTS

| 3,564,988 | A | * | 2/1971 | Jones | 396/330 |
|---|---|---|---|---|---|
| 3,922,093 | A | * | 11/1975 | Dandliker et al. | 348/128 |
| 4,643,578 | A | * | 2/1987 | Stern | 348/241 |
| 4,750,140 | A | * | 6/1988 | Asano et al. | 382/108 |
| 4,757,379 | A | * | 7/1988 | Wright | 348/42 |
| 4,794,262 | A | * | 12/1988 | Sato et al. | 348/138 |
| 5,550,641 | A | * | 8/1996 | Shashua et al. | 348/370 |
| 5,552,890 | A | * | 9/1996 | Nanna et al. | 348/128 |
| 5,739,928 | A | | 4/1998 | Scott | |
| 5,818,959 | A | * | 10/1998 | Webb et al. | 348/47 |
| 5,864,364 | A | * | 1/1999 | Ohyama et al. | 348/370 |
| 5,917,541 | A | * | 6/1999 | Nakagome et al. | 348/188 |
| 6,014,472 | A | * | 1/2000 | Minami et al. | 345/426 |
| 6,215,461 | B1 | * | 4/2001 | Ishibashi et al. | 348/39 |
| 6,240,204 | B1 | * | 5/2001 | Hidaka et al. | 382/167 |
| 6,256,035 | B1 | * | 7/2001 | Katayama et al. | 345/426 |
| 6,259,426 | B1 | * | 7/2001 | Harada et al. | 345/581 |
| 6,327,374 | B1 | * | 12/2001 | Piironen et al. | 382/108 |
| 6,373,531 | B1 | * | 4/2002 | Hidaka et al. | 348/602 |
| 6,466,334 | B1 | * | 10/2002 | Komiya et al. | 358/501 |
| 6,545,677 | B1 | * | 4/2003 | Brown | 345/426 |
| 6,633,338 | B1 | * | 10/2003 | Pelsue et al. | 348/370 |
| 6,697,062 | B1 | * | 2/2004 | Cabral et al. | 345/426 |

FOREIGN PATENT DOCUMENTS

| JP | 5-216452 | 8/1993 |
|---|---|---|
| JP | 6-51732 | 2/1994 |
| JP | 06-060189 | 3/1994 |
| JP | 07-057118 | 3/1995 |
| JP | 08-123981 | 5/1996 |

(Continued)

*Primary Examiner*—Thai Tran
*Assistant Examiner*—Jason Whipkey
(74) *Attorney, Agent, or Firm*—Frishauf, Holtz, Goodman & Chick, P.C.

(57) ABSTRACT

An image processing apparatus is provided which includes an image input apparatus for inputting an image including an object. The image is input into a reproducing environment converting unit, which sets a desired illuminating environment on a monitor display screen in which the image is reproduced. The reproducing environment unit converts the image of the object by three-dimensionally moving and rotating the object in the set environment, and an image output apparatus displays and prints the converted image.

25 Claims, 8 Drawing Sheets

FOREIGN PATENT DOCUMENTS

| | | |
|---|---|---|
| JP | 08-221560 | 8/1996 |
| JP | 09-033347 | 2/1997 |
| JP | 09172649 * | 6/1997 |
| JP | 10-222653 | 8/1998 |
| JP | 11-85952 | 3/1999 |
| JP | 11-317875 | 11/1999 |

* cited by examiner

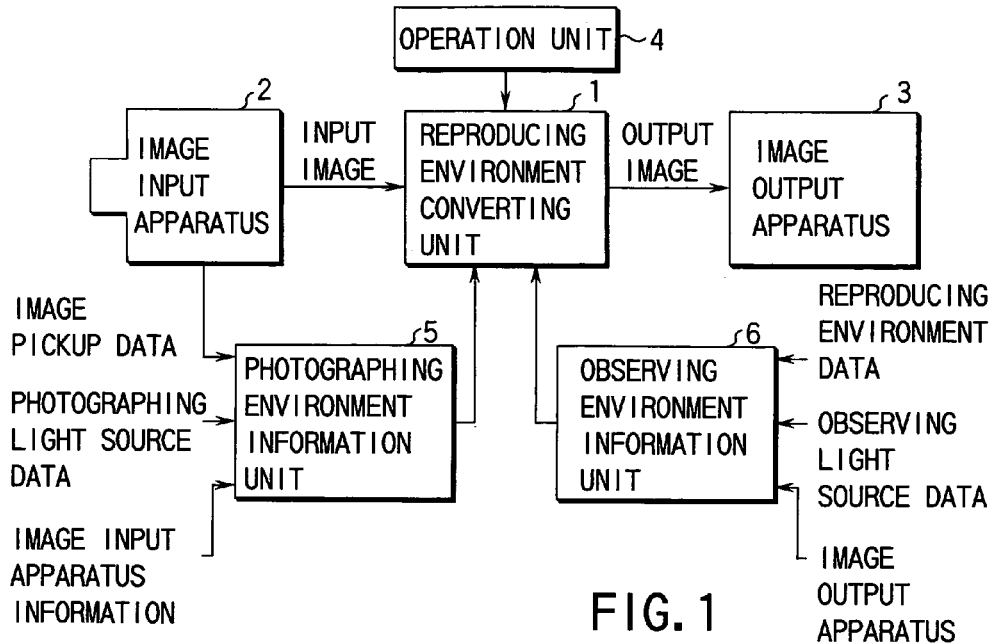
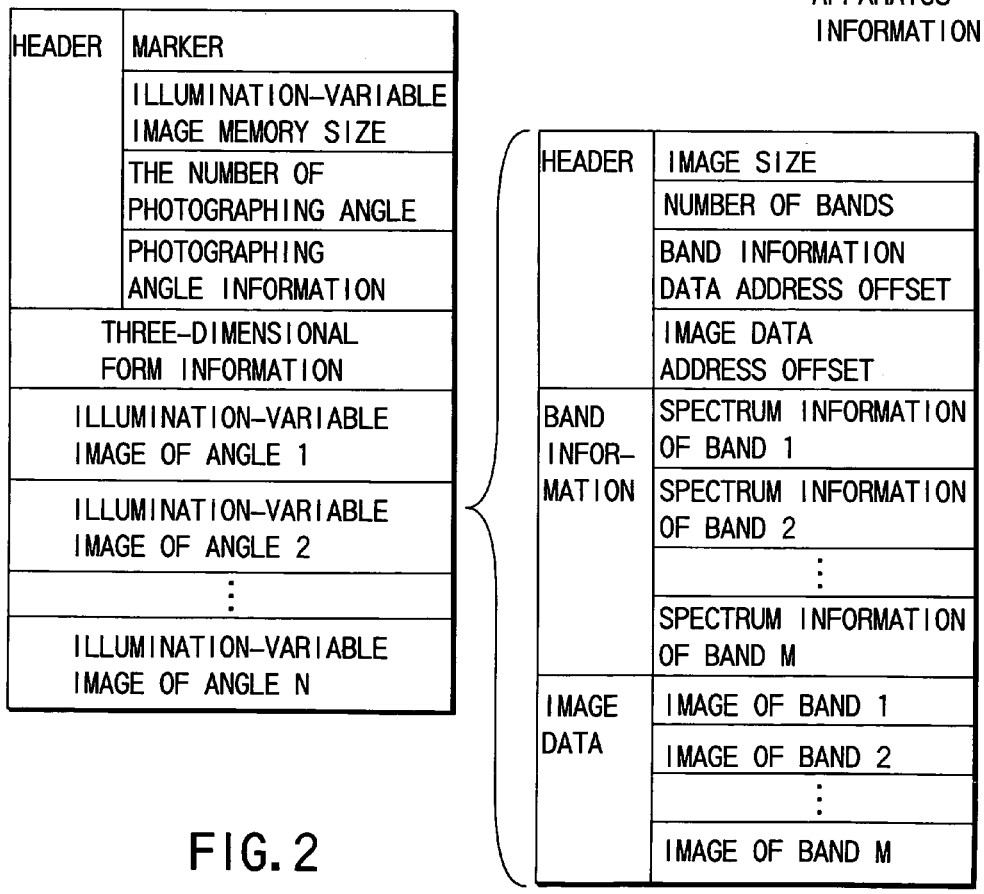
FIG. 1
FIG. 2

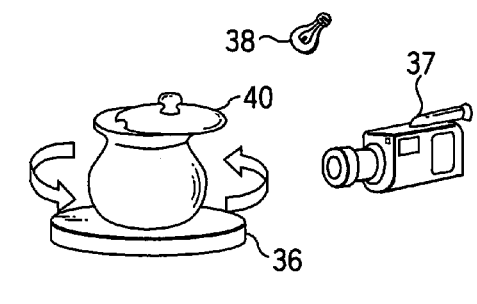
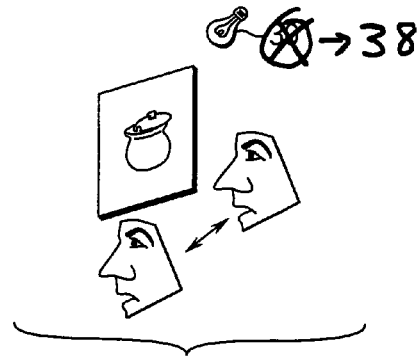
FIG. 6A          FIG. 6B
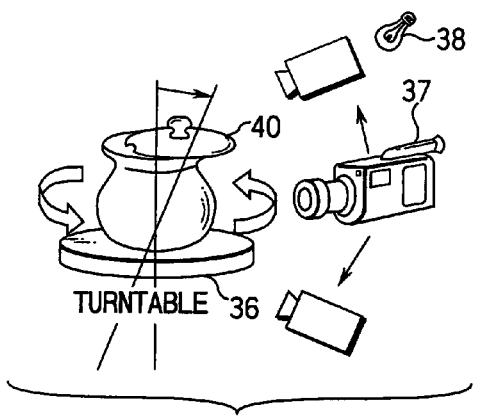
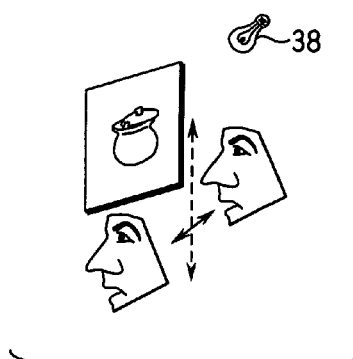
FIG. 6C          FIG. 6D
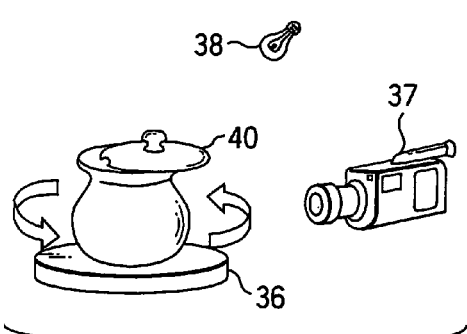
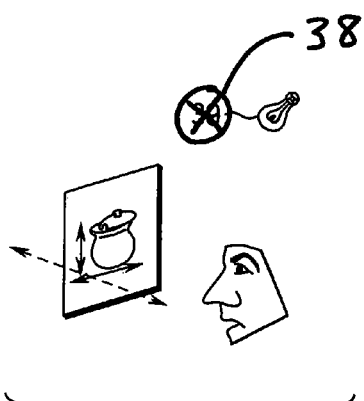
FIG. 7A          FIG. 7B

IMAGE PROCESSING APPARATUS FOR CORRECTING A COLOR AND TEXTURE OF AN IMAGE AND DISPLAYING THE CORRECTED IMAGE

BACKGROUND OF THE INVENTION

The present invention relates to an image processing apparatus for changing the position and the direction of an image of an object taken by a camera and changing the position and the form of illuminating light, thereby correcting the color and the feel of material of the image and displaying the corrected image.

Conventionally, various attempts have been made to print or display an image of an object on a printed matter or a TV monitor with a color and the feel of material, which are similar to those actually recognized by the human eyes.

As the performance of the computer has increased and the DTP system (desk top publishing, electronic publishing) has spread in recent years, various techniques for performing color matching have been proposed to make the displayed color resemble the actual color of the object recognized by the human eyes (e.g. Jpn. Pat. KOKAI Publications Nos. 5-216452 and 6-51732).

A representative of this color matching technique, a CMS (color management system), includes a color correcting unit provided between an image input apparatus, such as a camera, and an image output apparatus, such as a TV monitor. The color correcting unit has an input profile for photographing and an output profile for observation in image reproduction. The color correcting unit converts the color of an input image to a color independent of the image input apparatus or the image output apparatus (hereinafter referred to as a device independent color). Then, it performs color correction based on illuminating environment of an output image.

In the aforementioned CMS, light sources on both input and output sides are designated to D50. Therefore, if an image is photographed or output under illuminating light other than D50, there will be a problem that the observed color cannot match the actual color.

To solve this problem, the applicant proposed a color reproducing apparatus in Japanese Patent Application No. 9-243634. If the photographing place and the reproducing place are distant from each other, a photographed image is transmitted to the reproducing apparatus through a network or the like. When the image is reproduced, the reproducing apparatus performs color matching by means of spectrum, spectrum-converts the illuminating light, and accurately reproduces the color of the photographed object in the observing environment.

In the color reproducing apparatus, an input profile is referred to when an image input through an image input apparatus or the like is converted to a device independent color image, as shown in FIG. 14. The input profile is prepared on the basis of image input apparatus information and environment information. The image input apparatus information includes characteristics of the image input apparatus used to photograph the image and setting status of the characteristics. The environment information includes photographing light data on light for photographing an image of the object by the image input apparatus, observing light data concerning the place where the photographed image of the object is observed, and spectrum statistics data of the photographed object.

When an image is reproduced in the image output apparatus, the accurate spectral reflectance of the object itself in the photographing time is calculated from the characteristics of the image input apparatus, the setting status of the characteristics and the photographing light data. The influence of the photographing light is eliminated by the calculated spectral reflectance. Further, a color under the illumination light in the place where the object is to be observed is calculated on the basis of the observing light data. With the spectrum statistics data of the photographed object, a color-reproduced image can be estimated accurately, even if the input image has little spectrum information.

As described above, the color reproducing apparatus proposed by the applicant converts an image with reference to the image input apparatus information, and the color reproducing environment information which includes spectrum data of photographing and observing light and spectrum statistics data of the photographed object. Therefore, even if the photographing place and the reproducing place are distant from each other, or offset light or external light is varied, the color of the object can be reproduced accurately by the function of the output profile.

In the above color reproducing apparatus, however, reproduction of the feel of material or glossiness of an object has not been particularly taken into account.

Therefore, even when the above color reproducing apparatus is used, if different light fixtures are used in the photographing place and the reproducing place, the condition of specular reflecting on the object is varied and appearance is also changed. Accordingly, it is difficult to completely transfer the feel of material and glossiness of the photographed object only by the color reproduction utilizing color conversion.

BRIEF SUMMARY OF THE INVENTION

An object of the present invention is to provide an image processing apparatus in which an image of a photographed object is freely moved and rotated, and the form, the radiating angle and the position of illuminating light in the observing place are taken into account, so that not only the color of the object can be corrected but also the feel of material, glossiness, 3D-effects and reality of the object can be transferred to the observer.

According to the present invention, there is provided an image processing apparatus for processing an image of an object taken by an image input apparatus by means of a reproducing environment converting unit, and displaying or printing the processed image in an image output apparatus, wherein the reproducing environment converting unit converts the image into an image which can be observed in a desired reproducing environment based on photographing environment information and observing environment information.

In the image processing apparatus, the reproducing environment converting unit comprises a color converting unit for converting the image based on a difference in illuminating light spectrum between a photographing place and an observing place with reference to either the photographing environment information including information on the image input apparatus, photographing illumination spectrum information, and object characteristic information, or the observing environment information including information on the image output apparatus and observing illumination spectrum information.

In the image processing apparatus, the reproducing environment converting unit converts the image with reference to the photographing environment information including at least one of image pickup information, photographing light source information and object three-dimensional form information, and the observing environment information including at least one of illuminating light form information in an observing place, illuminating light position information in the observing place, object direction information, object position information and observer position information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic diagram showing an image processing apparatus of the present invention;

FIG. 2 is a diagram showing a reproducing environment-variable format in which photographing environment information and observing environment information are formatted;

FIGS. 6A, 6B, 6C and 6D are diagrams for explaining a third embodiment of the present invention;

FIGS. 7A and 7B are diagrams for explaining a fourth embodiment of the present invention;

DETAILED DESCRIPTION OF THE INVENTION

Figure 3:
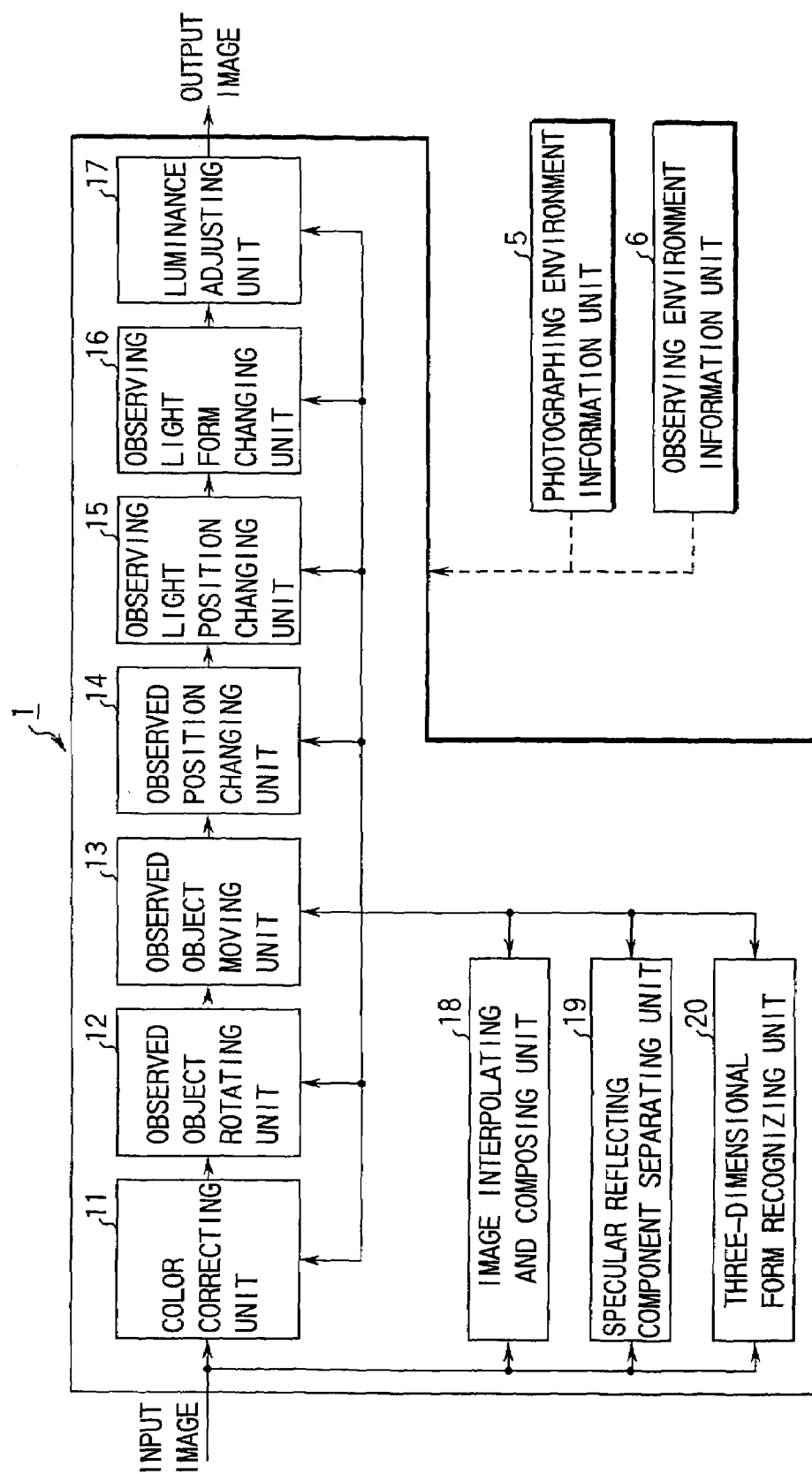
FIG. 3 is a diagram showing a detailed structure of the reproducing environment converting unit shown in FIG. 1.

Embodiments of the present invention will be described in detail with reference to the accompanying drawings.

FIG. 1 shows a schematic structure of an image processing apparatus of the present invention.

In the image processing apparatus, when an image taken by the apparatus is reproduced, illuminating environment is set based on the illuminating light in a reproducing place. Thereafter, the position and the direction of the image of an object on a monitor display screen is changed by moving and rotating the object three-dimensionally, so that the object can be observed from a desired direction. Then, the apparatus subjects the image to desirable color correction and displays or prints the corrected image.

The image processing apparatus comprises an image input apparatus 2 for taking an image including an object; a reproducing environment converting unit 1 for changing the position and the direction of the object on the monitor display screen, and an image output apparatus 3 for displaying and printing the image.

The image input apparatus 2 includes a single camera or two cameras stereoscopically arranged. The camera may be a digital still camera, a video camera, or a multi-spectrum camera. The camera or cameras receive an optical image, photo-electrically convert it to image data constituted by an electric signal, and output the photographed image and information on the status of the cameras at the photographing time (image pickup data).

The image output apparatus 3 comprises a TV monitor and a printer, or the like, and displays and prints the image. In this embodiment, the TV monitor also serves as a monitor for confirming the set illuminating environment and the position and the direction of the object, when image processing is performed. Alternatively, two TV monitors may be individually used for the different purposes. The image processing apparatus also comprises an operation unit 4, such as a keyboard and a pointer.

To perform image processing, for example, changing of the illuminating environment or the position and the direction of the object, image pickup data and photographing light source data are supplied to the reproducing environment converting unit 1 from a photographing environment information unit 5. The image pickup data, output from the image input apparatus 2, include a photographing angle with respect to the object (the table surface is regarded as horizontal), the number of photographed images and the position of the camera. The photographing light source data, set in advance or detected by a spectroscope and a luminous intensity photometer (not shown), include a photographing light spectrum, the light intensity, the form of illuminating light, the position of the light source with respect to the object, and the number of light sources.

The photographing environment information may include spectrum statistics data of the photographed object, so that the color correction can be performed more accurately. Reproducing environment data and observing light source data are supplied from an observing environment information unit 6 to the reproducing environment converting unit 1. The reproducing environment data include the position and the direction of the object in the display screen to be observed and the position of the observer with respect to the image output apparatus. The observing light source data, set in advance or detected by the spectroscope or the luminous intensity photometer (not shown), include an observing light spectrum in the observation place, the form of observing light, the position of the light source, the number of light sources, and the intensity of the observing light.

The photographing environment information is formatted with image of object, as shown in FIG. 2. The variable reproducing environment image format is obtained by successively photographing an object, while the light source, the camera or the object is moved or rotated, and formatting the photographed image and the data relating to the image.

In particular, radiating angles of illuminating light relative to the object are classified and recorded in the format.

The formatted image data can be transmitted to an image reproducing place, apart from the photographing place, through a network or a recording medium, as will be described later.

FIG. 3 shows a detailed structure of the reproducing environment converting unit 1.

The reproducing environment converting unit 1 comprises a color correcting unit 11 for color-correcting the image photographed by the image input apparatus 2 so as to adapt to the observing environment.

The reproducing environment converting unit 1 also comprises an observed object rotating unit 12 for rotating the color-corrected object about a set axis in a desired direction, so that the object can be observed in the desired direction on the display screen of the TV monitor or the like. Further, it comprises an observed object moving unit 13 for moving the object on the displayed screen three-dimensionally, up and down, left and right, and back and forth; and an observing position changing unit 14 for changing the direction of the object as if the viewpoint of the observer were changed.

Furthermore, the reproducing environment converting unit 1 comprises an observing light position changing unit 15 for changing the direction of illuminating light for radiating the object, an observing light form changing unit 16 for changing the form of the observing light (a point light source, a line light source, etc.), and a luminance adjusting unit 17 for adjusting the luminance of the image.

Further, the reproducing environment converting unit 1 comprises an image interpolating and composing unit 18 for subjecting a plurality of input images supplied from the image input apparatus 2 to an interpolation process and an image composite process for superimposing images of the same object. It also comprises a specular reflecting component separating unit 19 for geometrically separating a specular reflecting component from the angle of incidence of the illuminating light radiated on the object and the angle of rotation of the object. Furthermore, it comprises a three-dimensional form recognizing unit 20 for recognizing the form of the object on the display screen. These units perform respective processes and output necessary data to the units 11 to 17.

If an image is photographed and observed in different places and the illuminating environment in the observing place is different from that of the photographing place, the color of the displayed or printed image cannot be the same as the actual color of the object. To avoid this, when the image is reproduced, the color correcting unit 11 corrects the color to adapt to the illuminating environment of the reproducing place, with reference to information, such as the illuminating environment in the photographing time and the set status of the image input apparatus 2, transmitted along with the image. As a result, the color of the object at the photographing time is reproduced. The color can be corrected more accurately by means of the spectrum statistics data of the photographed object.

More specifically, the input image input through the image input apparatus 2 is converted to a device independent color image with reference to the information supplied from the photographing environment information unit 5 and the observing environment information unit 6. When the image is reproduced on the image output apparatus 3, the accurate spectral reflectance of the object itself in the photographing time is calculated from the characteristics of the image input apparatus 2, the set status of the characteristics and the photographing light data. The influence of the photographing light is eliminated by the calculated spectral reflectance. Further, a color under the illumination light in the place where the object is to be observed is calculated from the illuminating data in the observing time. With the statistic characteristic of the spectral reflectance of the photographed object, a color-reproduced image can be estimated accurately, even if the input image has little spectrum information. Basically, the color correction is performed with respect to all images. However, if the illuminating environment in the observing time is the same as that in the photographing time, the color correction is not necessarily required. Further, color correction may be selectively performed in accordance with the kind or color of the object.

To realize the image processing apparatus of the present invention, an image including the object must be photographed so as to be variable in accordance with the reproducing environment.

Embodiments of the present invention will be described below, along with an image photographing method necessary for changing the image in accordance with the reproducing environment.

Figure 4:
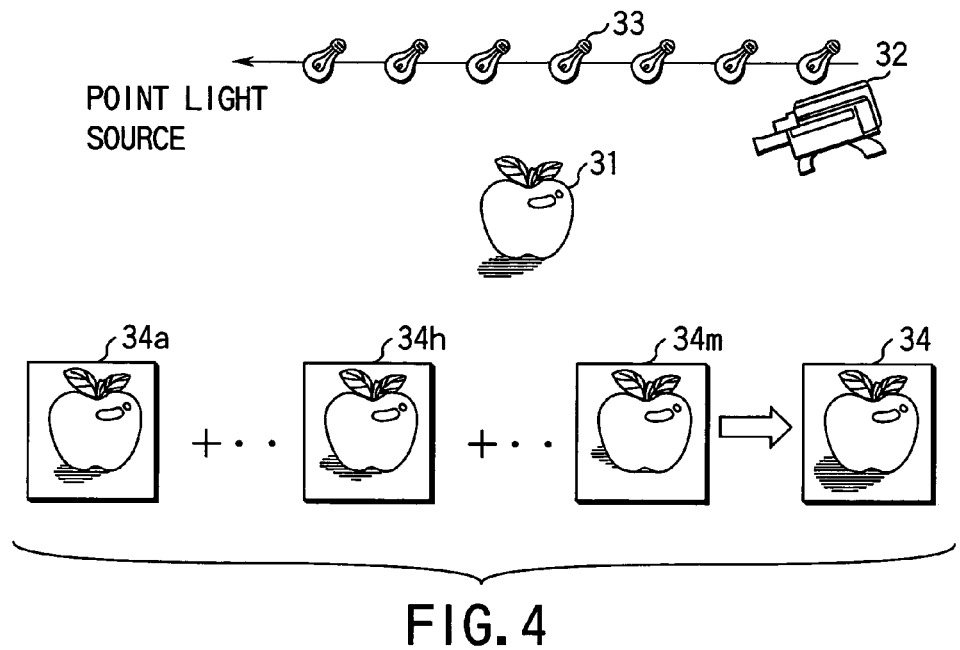
FIG. 4 is a diagram for explaining a first embodiment of the present invention.

A first embodiment will be described with reference to FIG. 4. The first embodiment allows a change in form of the light illuminating the object.

In general, the light illuminating an object is either a point light source, such as a light bulb, or a line light source, such as a fluorescent lamp.

In this embodiment, an object 31 and a camera 32 are fixed, while a point light source 33 is linearly moved to continuously, so that a plurality of images 34a to 34m can be photographed. Some of the continuously photographed images including the same object 31 are interpolated and composed to form an image 34 under the point light source at a desired position or a line light source at a desired position. When the images are photographed, the exposure time may be varied to extend the dynamic range at the input time.

The apparatus of this embodiment comprises an image input apparatus 2, a color correcting unit 11, an observing light position changing unit 15, an observing light form changing unit 16, an image interpolating and composing unit 18, an operation unit 4 and an image output unit 13, shown in FIG. 3.

With this structure, if a plurality of images are continuously photographed while the point light source is moved linearly, and images within a period are interpolated and composed, an image of the object illuminated with a linear illuminating light can be observed as if a fluorescent lamp of a straight tube were used. Consequently, a gloss of the light reflected by the object can be obtained, with the result that a desired image can be reproduced.

A second embodiment will be described with reference to FIGS. 5A and 5B.

Figure 5A:
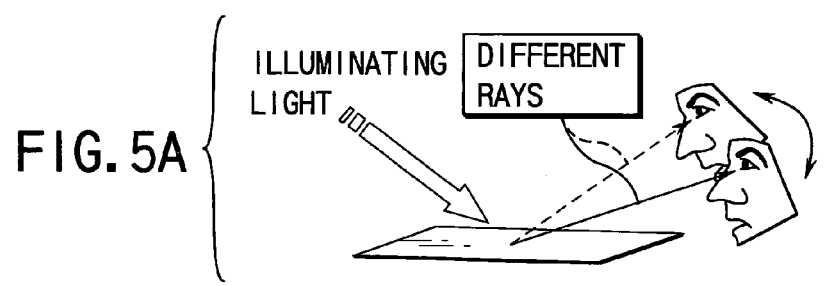
FIGS. 5A and 5B are diagrams for explaining a second embodiment of the present invention.

When a plate-like object having a rugged surface is observed, if the observer changes the observing position as shown in FIG. 5A, the reflecting condition of the illuminating light varies. The second embodiment can realize the reflecting condition and the feel of material.

Figure 5B:
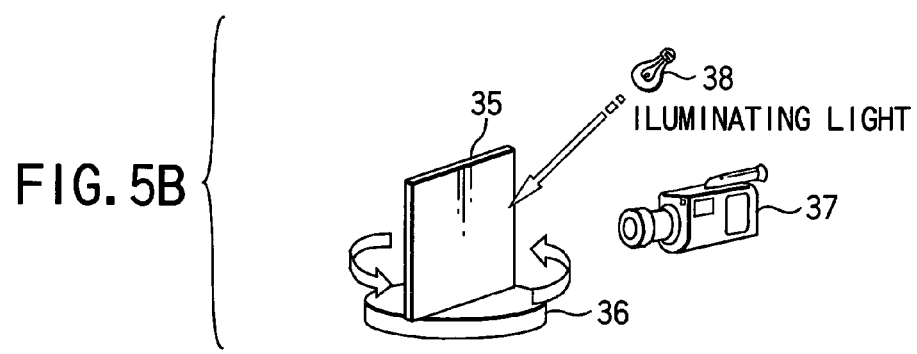

According to this embodiment, as shown in FIG. 5B, an object 35, for example, a sample of textiles or building materials, is mounted on a turntable 36. A camera 37 is fixed at a distance from the object. A point light source 38 is disposed at a position, from which an illuminating light is incident on the object at an angle. The turntable 36 is rotated within a range, while a plurality of images are continuously photographed.

The apparatus of this embodiment comprises an image input apparatus 2, a color correcting unit 11, an observed position changing unit 14, an observing light position changing unit 15, an observing light form changing unit 16, an image interpolating and composing unit 18, a specular reflecting component separating unit 19, an operation unit 4 and an image output unit 13, shown in FIG. 3.

With this structure, a specular reflecting component and a diffusion reflecting component of the object are separated from each other on the basis of the geometric factors, such as the incident angle of the illuminating light into the object, the rotation angle of the object, and the distance between the camera and the object. Alternatively, a rotating object may be photographed, using a polarizing filter attached to the photographing lens of the camera, to separate a specular reflecting component and a diffusion reflecting component of the object from each other.

This embodiment allows the direction of the displayed object to be changed as if the observer looked at the object at a desired angle. Therefore, the glossiness and the feel of material of the object can be observed, based on the specular reflecting and the diffuse reflection, which vary depending on the angle. If the object is a sample having a relatively flat surface, the displayed image can be a standard for determining whether to select the sample.

The camera may be rotated around an object to photograph it. Further, the image output apparatus may trace the position of the observer's face and display images at different observing angles in accordance with the positions, so that the glossiness, the feel of material and reality can be improved.

A third embodiment will be described with reference to FIGS. 6A to 6D.

In the third embodiment, a point light source 38 is mounted as shown in FIG. 6A, and an object 40 placed on and rotated by a turntable 36 is continuously photographed by a fixed camera 37. In the observing time, the apparatus reproduces not only the front view of a surface of the object 40 but also the views at desired angles observed when the observer moves to face, for example, left and right from the front.

The apparatus of this embodiment comprises a color correcting unit 11, an observed position changing unit 14, an image interpolating and composing unit 18, a specular reflecting composition separating unit 19, a three-dimensional form recognizing unit 20, an operation unit 4 and an image output apparatus 3.

With this structure, as shown in FIG. 6B, the object displayed on the monitor display screen is rotated by a desired angle in accordance with a command from the operation unit 4. As a result, a side or back surface of the object can be continuously observed as if the observer turned around.

In the structure shown in FIG. 6A, the object is rotated only in the horizontal direction. FIG. 6C shows a modification in which the observed position can be changed also in the vertical direction.

In the modification, a point light source 38 is mounted as shown in FIG. 6C, and an object 40 placed on and rotated by a turntable 36 is continuously photographed by a fixed camera 37. At this time, the turntable 36 is inclined at a desired angle to shift the rotation angle obliquely. Actually, an image can be photographed at an inclined angle by moving the camera 37 up or down, while the turntable 36 is kept horizontal.

The images photographed in this way are processed by the reproducing environment converting unit having the same structure as that of the third embodiment. As a result, the object 40 can be observed not only horizontally but also obliquely, from an upper or lower point.

A fourth embodiment will be described with reference to FIGS. 7A and 7B.

As in the third embodiment described above, a point light source 38 is mounted, and an object 40 placed on and rotated by a turntable 36 is continuously photographed by a fixed camera 37.

The apparatus of this embodiment comprises an image input apparatus 2, a color correcting unit 11, an observed object moving unit 13, an image interpolating and composing unit 18, a specular reflecting composition separating unit 19, a three-dimensional form recognizing unit 20, an operation unit 4 and an image output apparatus 3, shown in FIG. 3.

With this structure, in the observing time, an image of the object displayed on the screen is drugged by a pointer moved by the mouse in the operation unit 4, so that an image three-dimensionally moved to a desired position under set observing light environment is reproduced and displayed on the screen. Since the condition of the illuminating light radiated on the object is varied by this movement, the observer can recognize the glossiness and the feel of material of the object.

A fifth embodiment will be described with reference to FIGS. 8A and 8B.

As in the third embodiment described above, a point light source 38 is mounted, and an object 40 placed on and rotated by a turntable 36 is continuously photographed by a fixed camera 37.

The apparatus of this embodiment comprises an image input apparatus 2, a color correcting unit 11, an observing light position changing unit 15, an observing light form changing unit 16, an image interpolating and composing unit 18, a specular reflecting composition separating unit 19, a three-dimensional form recognizing unit 20, an operation unit 4 and an image output apparatus 3, shown in FIG. 3.

Figures 8A, 8B:
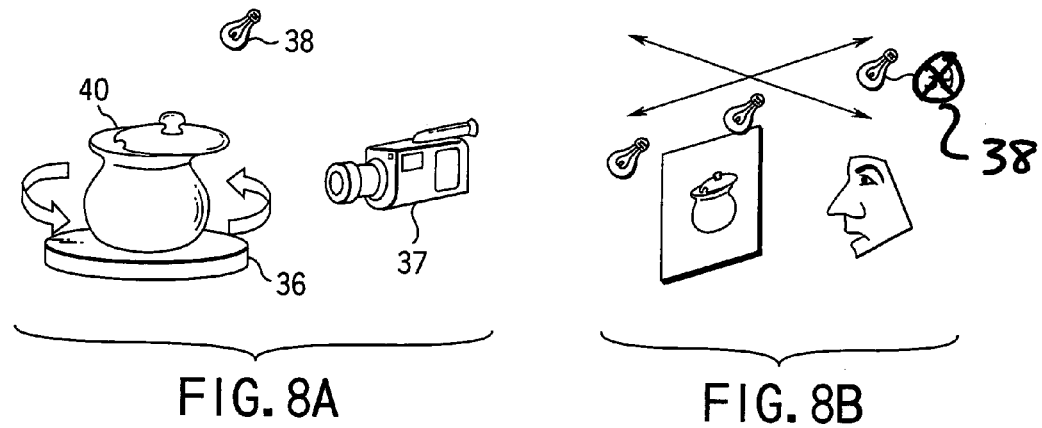
FIGS. 8A and 8B are diagrams for explaining a fifth embodiment of the present invention.

With this structure, as shown in FIG. 8B, the direction of the object can be set in the display screen and the image can be reproduced with a desired form of illuminating light in a desired radiating direction. Therefore, when the object is displayed, layout of the illuminating light source can be simulated.

Figure 9:
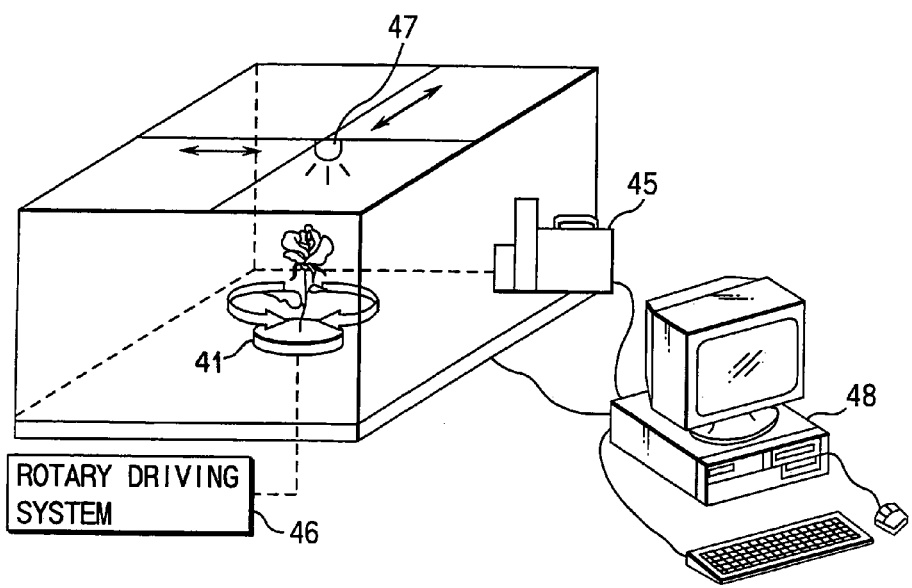
FIG. 9 is a diagram for explaining a sixth embodiment of the present invention.

A sixth embodiment will be described with reference to FIG. 9.

This embodiment is a system for easily providing an image according to the first to fifth embodiments.

In the sixth embodiment, for example, a multi-spectrum camera 45 is used as the image input apparatus 2 and a turntable 41 is driven by a rotary driving system 46 such as a motor. A point light source 47 for emitting illuminating light, mounted above the turntable, is driven by a driving system for moving it two dimensionally. The drive of these components is controlled by programs prepared by a personal computer 48.

With the above structure, to obtain a desired image, the linear movement of the point light source 47, the rotation control of the turntable 41 and the photographing operation of the multi-spectrum camera 45 are all performed automatically.

Figure 10:
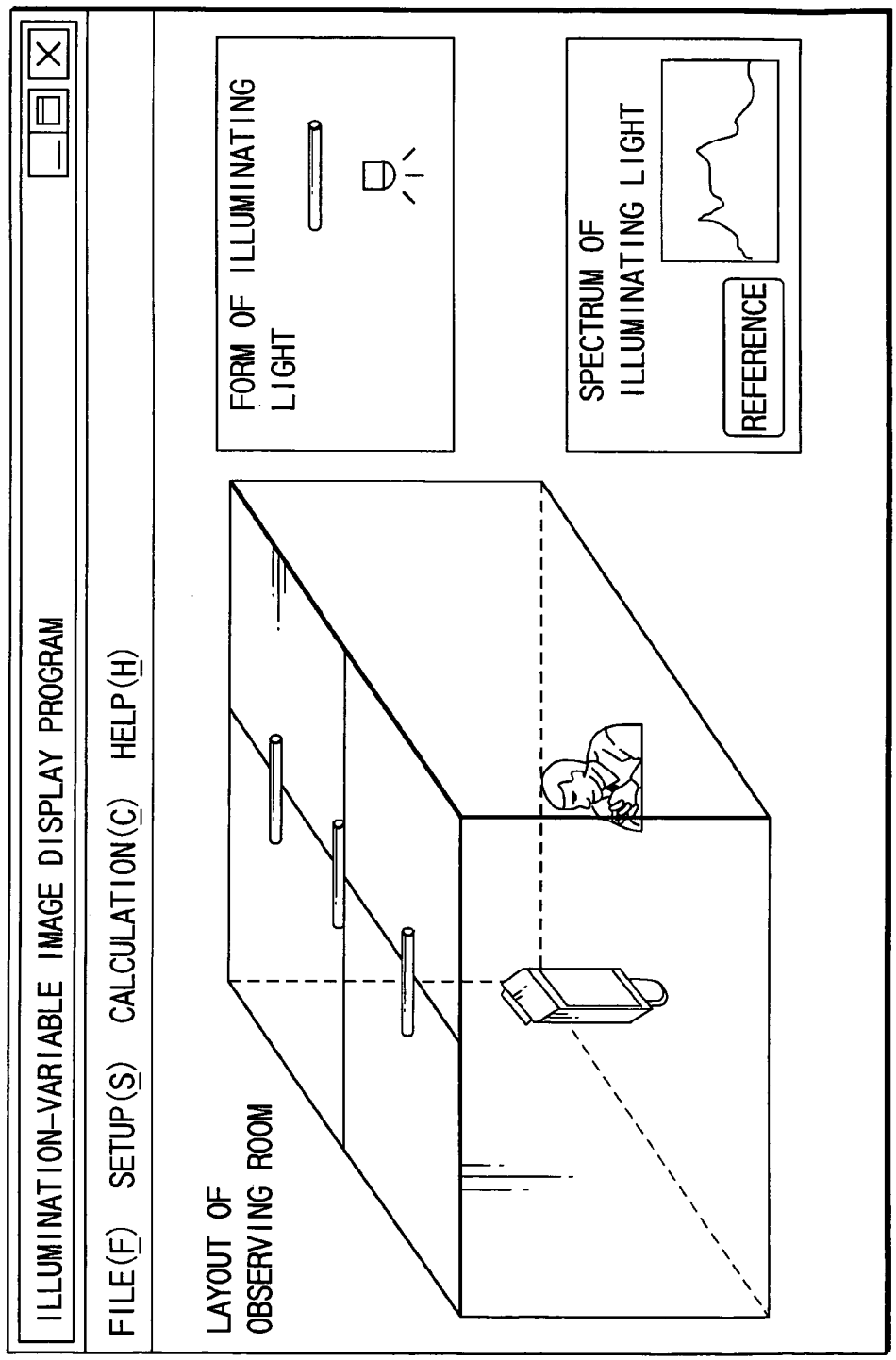
FIG. 10 is a diagram for explaining a seventh embodiment of the present invention.

A seventh embodiment of the present invention will be described with reference to FIG. 10.

This embodiment is a display screen for setting color correction of a displayed object, changing the position and direction of thereof, changing the position and form of observing light, etc.

The display screen is constructed by an illumination-variable image display program and a graphical user interface (GUI). The main screen includes sections for setting the kind and arrangement of illuminating light in the observing place and the position of the observer: an observing room layout setting section for displaying a three-dimensional layout of the observing room; an illuminating light form setting section for selecting a form of illuminating light; and an illuminating light spectrum setting section for displaying a spectrum of illuminating light of the set or selected light source. The observer can set a desired illuminating light environment, while referring to the display screen.

Figure 11:
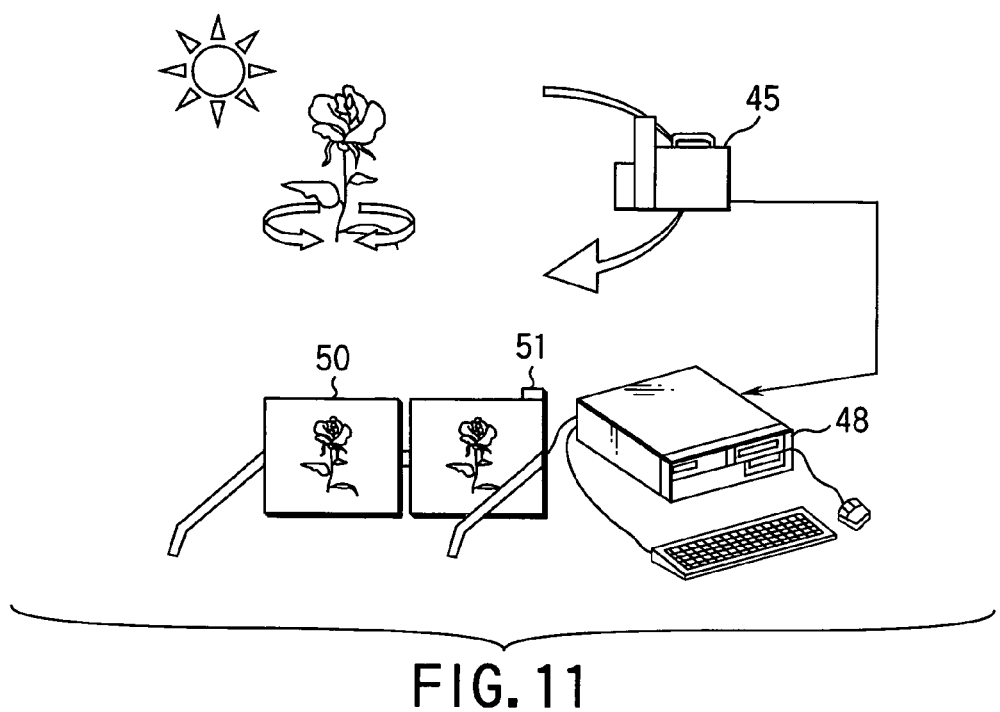
FIG. 11 is a diagram for explaining an eighth embodiment of the present invention.

An eighth embodiment will be described with reference to FIG. 11.

In the preceding embodiments, setting and observation are executed through the display screen of the monitor. The eighth embodiment is an imaging system including a head mounting display (HMD). In this system, an image is displayed by means of a computer incorporating a reproducing environment converting unit as a program, so that the feel of material of an object can be realized with high accuracy.

The HMD 50 of this embodiment is provided with a gyroscopic sensor 51 to detect even slight movement of the observer's head and reflect it to the relative position between the displayed object and the observer.

According to this embodiment, when an image is output, an image photographed by the aforementioned multi-spectrum camera or the like is first input to the HMD 50. The color of an image displayed in the HMD is corrected in accordance with the observing light environment. The observing light is incident on the observer's eyes through a see-through function of the HMD (function for observing an external object through an LCD) or a see-around function (function for observing the outside through a gap between the observer and the HMD). As a result, the observer's eyes can be easily adapted to the illuminating light in the observing place.

The color-corrected image is stereoscopically displayed. The image of the object is rotated and moved in the displayed screen by means of the mouse of the computer. As the HMD 50 is turned left and right, images of the object observed in slightly different angles are displayed on the basis of signals detected by the gyroscopic sensor 51. As a result, the feel of material, 3D-effects and reality of the object is expressed in the image. A stereoscopic image may be displayed, or a holographic image may be stereoscopically displayed.

Figure 12:
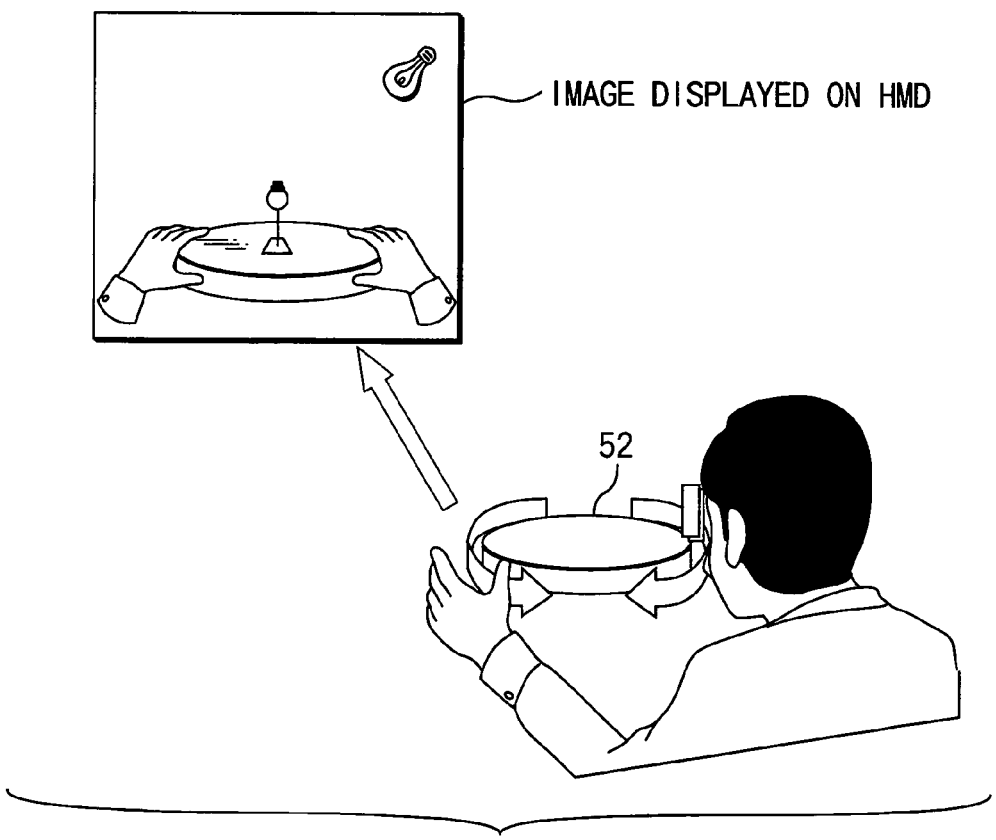
FIG. 12 is a diagram showing an example of a rotation angle input apparatus of a turntable type used in the eighth embodiment of the present invention.

In the above embodiments, the mouse is used to move or rotate the image of the object on the screen. However, as shown in FIG. 12, a rotation angle input apparatus 52 of a turntable type may be used for the same purpose. If the rotation angle input apparatus 52 is formed to have a size (diameter) according to the size of the object displayed on the screen of the HMD 50, the observer can easily imagine the size of the object.

Figure 13:
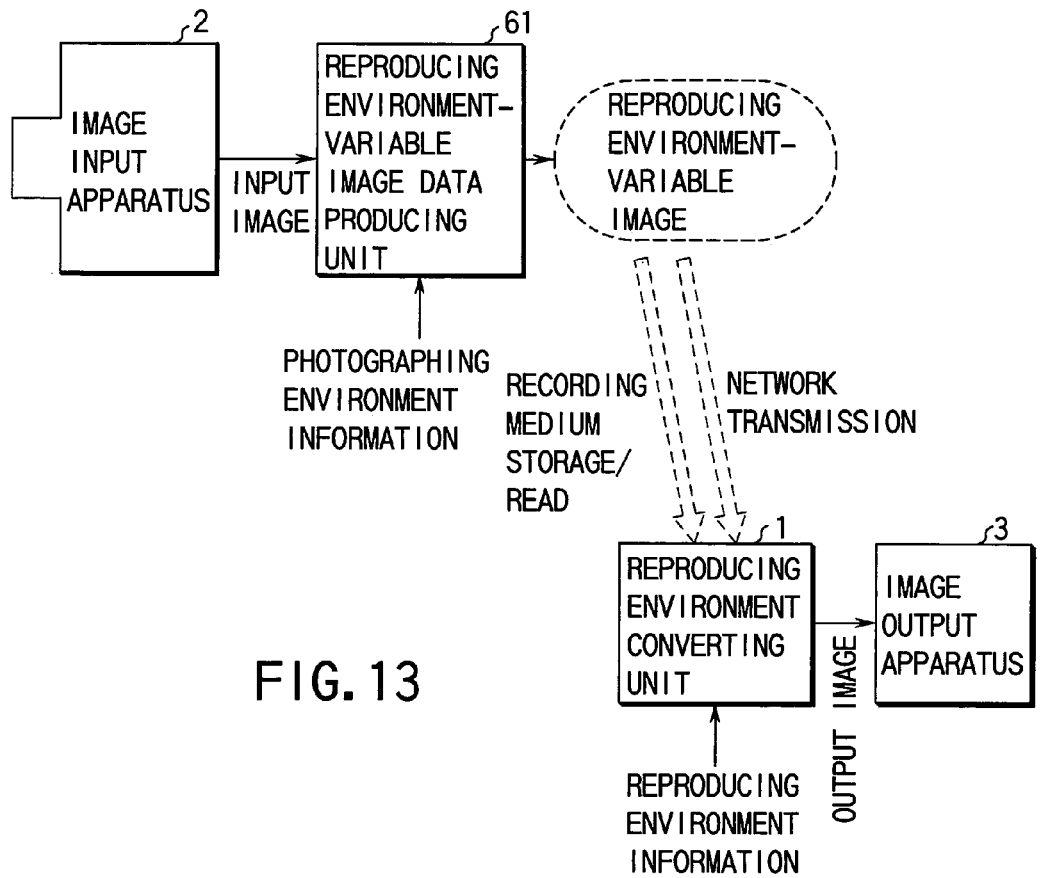
FIG. 13 is a diagram showing an image processing apparatus used in a ninth embodiment of the present invention.
Figure 14:
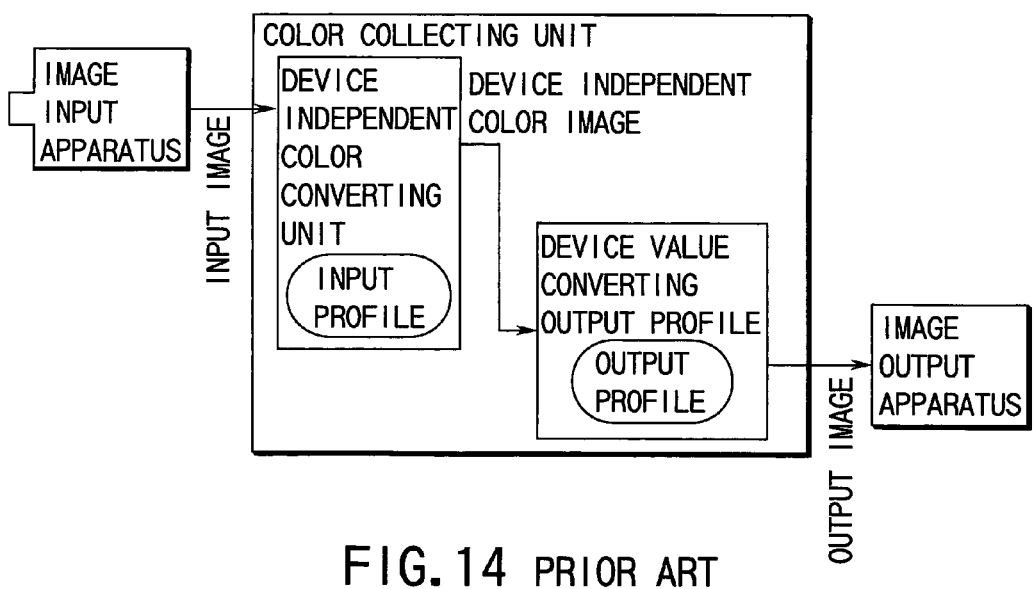
FIG. 14 is a diagram showing a conventional color reproducing apparatus utilizing a device independent color image.

A ninth embodiment will be described with reference to FIG. 13.

This embodiment is applied to a case where the reproducing place is located far from the photographing place, and an image to be reproduced is transmitted via a network or a recording medium, such as a CDROM, sent by mail.

The apparatus of this embodiment comprises a reproducing environment-variable image data producing unit 61, the aforementioned reproducing-environment converting unit 1 and the image output apparatus 3 for displaying and printing an image. The reproducing environment-variable image data producing unit 61 converts an image including the object taken by the image input apparatus 2, as in the above embodiments, to a so-called device independent color image, with reference to photographing environment information including image pickup data in the image input apparatus 2 and photographing light source data at the photographing time. The reproducing-environment converting unit 1 processes a transmitted image with reference to the reproducing environment information, such as illuminating information in the place where the image is to be reproduced.

If this embodiment is applied to a catalog of clothing or electronic devices, potential purchasers can recognize the color and the feel of material of a product equivalent to those that they can recognize when actually observing the product.

In this embodiment, a formatted reproduction environment-variable image data (including the photographing environment information) is unidirectionally transmitted. However, the information may be transmitted in two ways. In this case, observing environment information is transmitted to the reproducing environment-variable image data producing unit 61, and used to produce an image along with the photographing environment information. In this arrangement, the reproducing environment converted image is transmitted to the reproducing side, resulting in reduction of time required to transmit and reproduce the image.

As has been described above in detail, the present invention can provide an image processing apparatus in which an image of a photographed object is freely moved and rotated, and the form, the radiating angle and the position of illuminating light in the observing place are taken into account, so that not only the color of the object can be corrected but also the feel of material, glossiness, 3D-effects and reality of the object can be transferred to the observer.

The gist of the present invention has the following functions and effects.

In an image processing apparatus of the present invention, an image of an object taken by an image input apparatus is processed by a reproducing environment converting unit, and the processed image is displayed or printed in an image output apparatus, the reproducing environment converting unit converting the image into an image which can be observed in a desired reproducing environment based on photographing environment information and observing environment information.

With this image processing apparatus, when the photographed image of the object is observed, it can be reproduced as if the object were present in the observing place.

In the above image processing apparatus, the reproducing environment converting unit comprises a color converting unit for converting the image based on a difference in illuminating light spectrum between a photographing place and an observing place with reference to either the photographing environment information including information on the image input apparatus, photographing illumination spectrum information, and object characteristic information, or the observing environment information including information on the image output apparatus and observing illumination spectrum information.

With this image processing apparatus, even if the light source illuminating the object in the photographing place is different from the light source for observing the displayed image in the reproducing place, a difference between illumination spectrums is detected, the spectrum is corrected in accordance with the light source for observing the image in the observing place, and the color is accurately reproduced.

Thus, the image can be reproduced as if the object were present in the observing place.

In the image processing apparatus, the reproducing environment converting unit converts the image with reference to the photographing environment information including at least one of image pickup information, photographing light source information and object three-dimensional form information, and the observing environment information including at least one of illuminating light form information in an observing place, illuminating light position information in the observing place, object direction information, object position information and observer position information.

The above image processing apparatus takes in image data to efficiently vary the reproducing environment by means of information on setting at the time when the image of the object is photographed, information on the three-dimensional form of the object, and information on illuminating light used in the photographing time. When the image of the object is observed, it is reproduced in accordance with the illuminating light form information, the illuminating light position information, the object direction information, the object position information and the observer position information, so that the image can be reproduced as if the object were present in the observing place.

In the image processing apparatus, the reproducing environment converting unit comprises an illuminating light form converting unit for converting the image to an image which can be observed under a desired illuminating light form based on designated illuminating light form information in the observing place.

Since the image processing apparatus has the illuminating light form converting unit, even if the illuminating light form in the photographing place is different from that of the observing place, an image of the object radiated with the illuminating light in the photographing place can be reproduced.

In the image processing apparatus, the reproducing environment converting unit comprises an illuminating light position converting unit for converting the image to an image which can be observed at a desired illuminating light position based on designated illuminating light position information in the observing place.

Since the image processing apparatus has the illuminating light position converting unit, even if the illuminating light position in the photographing place is different from that of the observing place, an image of the object illuminated with the illuminating light in the photographing place can be reproduced.

In the image processing apparatus, the reproducing environment converting unit comprises an object position converting unit for converting the image to an image which can be observed when the object is placed at a desired position, based on designated object position information.

Since the image processing apparatus has the object position converting unit, an image moved to a desire position in the observing place can be reproduced.

In the image processing apparatus, the reproducing environment converting unit comprises an object direction converting unit for converting the image to an image which can be observed when the object is placed in a desired direction, based on designated object direction information.

Since the image processing apparatus has the object direction converting unit, an image freely rotated in the photographing place can be reproduced.

In the image processing apparatus, the reproducing environment converting unit comprises an observer position converting unit for converting the image to an image which can be observed at a desired position, based on designated observer position information.

Since the image processing apparatus has the observer position converting unit, an image observed when the observer freely changes its position in the photographing place can be reproduced.

In the image processing apparatus, the reproducing environment converting unit comprises at least one of an image composing and interpolating unit, a specular reflecting component separating unit, and an object three-dimensional form recognizing unit, and utilizes it when calculating reproducing environment image.

Since the image processing apparatus has the image composing and interpolating unit, the specular reflecting component separating unit or the object three-dimensional form recognizing unit, an image accurately adapted to the observing environment can be reproduced.

In the image processing apparatus, the reproducing environment converting unit comprises: a reproducing environment-variable image data producing unit for producing reproducing environment-variable image data by using the photographing environment formation; data transmitting means for transmitting the reproducing environment-variable image data produced by the reproducing environment-variable image data producing unit through a portable recording medium or a network; and a reproducing environment-variable image data processing unit for converting an image in accordance with reproducing environment by using the reproducing environment information.

With the information processing apparatus of this structure, even if the photographing place and the observing place are distant from each other, the image in accordance with the observing environment can be reproduced in the observing place.

In the image processing apparatus, the image input apparatus controls a turntable for rotating the object at a desired angle, and automatically photographs images at a plurality of angles.

With this image processing apparatus having the image input apparatus, a plurality of images of data necessary for a reproducing environment-variable image can be easily photographed.

In the image processing apparatus, the turntable has a rotation axis which can be inclined.

With this image processing apparatus having the image input apparatus including the turntable the rotation axis of which can be inclined, the range of reproducible observing environment can be extended.

In the image processing apparatus, the image input apparatus moves a point light source to a desired position and automatically photographs the object illuminated with the point light source in a desired angle.

With the image processing apparatus having the image input apparatus of this structure, a plurality of images of data necessary for a reproducing environment-variable image can be easily photographed.

In the image processing apparatus, the image is photographed by a single camera or two cameras stereoscopically arranged, constituting the image input apparatus, the camera being selected from the group consisting of a digital still camera, a video camera and a multi-spectrum camera.

With the image processing apparatus having the image input apparatus of this structure, image data necessary for a reproducing environment-variable image can be easily photographed. If the stereoscopically arranged cameras are used, three-dimensional form information of the object, necessary for processing, can also be obtained.

In the image processing apparatus, the image output apparatus comprises a head mounting display (HMD) for displaying the processed image of the object, wherein one of a stereoscopic image and a holographic image is displayed in the head mounting display.

With the image processing apparatus having the image output apparatus of this structure, the observer can recognize the feel of material, the 3D-effects and the reality of the object more accurately.

In the image processing apparatus, the head mounting display of the image output apparatus has a sensor, such as a gyroscopic sensor, functioning as part of observing environment information instructing means of the reproducing environment converting unit, and changes the displayed image in accordance with movement of the head mounting display.

With the image processing apparatus having the image output apparatus, the image can be displayed interactively in accordance with the movement of the observer, so that the feel of material, the 3D-effects and the reality of the object can be recognized more accurately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing an image of an object, said apparatus comprising:
   a three-dimensional form recognizing unit which recognizes a three-dimensional form of the object by using image data of the object taken by an image input apparatus, and which outputs object three-dimensional form information regarding the three-dimensional form of the object;
   a specular reflecting component separating unit which separates a specular reflecting component from light reflected from the object in the image of the object, and which then outputs the specular reflecting component;
   an interpolating and composing unit which subjects the image data of the object taken by the image input apparatus to interpolation and composition processing to thereby obtain an image of the object, and which then outputs the obtained image of the object; and
   an observing light position changing unit which converts the image data of the object taken by the image input apparatus into an acquired image in which a direction of illuminating light for illuminating the object is changed, by using the three-dimensional form information, the specular reflecting component and the image obtained by the interpolation and composition processing, based on a difference between (i) photographing environment information comprising geometric information on a light source for illuminating the object when the object is photographed and (ii) observing environment information comprising information regarding an illumination environment of a place for observing an observation image of the object that is output from an image output apparatus, and which then outputs the acquired image.

2. An image processing apparatus according to claim 1, wherein the image data of the object taken by the image input apparatus comprises a plurality of images of the object taken by the image input apparatus.

3. An image processing apparatus according to claim 2, wherein the plurality of images of the object are obtained by performing an image capturing operation of the image input apparatus a plurality of times under respective conditions which are different with respect to a position of the light source with respect to the object.

4. An image processing apparatus according to claim 2, wherein the plurality of images of the object are obtained by performing an image capturing operation of the image input apparatus a plurality of times under respective conditions which are different with respect to relative positions of the image input apparatus and the object.

5. An image processing apparatus according to claim 4, wherein the plurality of images of the object are obtained by performing the image capturing operation of the image input apparatus a plurality of times, while rotating the object with respect to the image input apparatus.

6. An image processing apparatus according to claim 4, wherein the plurality of images of the object are obtained by performing an image capturing operation of the image input apparatus a plurality of times, while moving the image input apparatus with respect to the object.

7. An image processing apparatus according to claim 2, further comprising an observing light form changing unit which converts the acquired image output from the observing light position changing unit into an image in which a form of the illuminating light for illuminating the object changed, by using the three-dimensional form information, the specular reflecting component and the image obtained by the interpolation and composition processing, based on the difference between the photographing environment information and the observing environment information.

8. An image processing apparatus according to claim 1, further comprising an observing light form changing unit which converts the acquired image output from the observing light position changing unit into an image in which a form of the illuminating light for illuminating the object changed, by using the three-dimensional form information, the specular reflecting component and the image obtained by the interpolation and composition processing, based on the difference between the photographing environment information and the observing environment information.

9. An image processing apparatus according to claim 1, wherein the specular reflecting component separating unit further separates a diffusion reflecting component from the light reflected from the object in the image of the object and outputs the diffusion reflecting component.

10. An image processing apparatus according to claim 1, wherein the photographing environment information further comprises information regarding a color of the illuminating light for illuminating the object when the object is photographed, and the observing environment information further comprises information regarding a color of illuminating light for illuminating the place for observing the observation image of the object when the object is observed.

11. An image processing apparatus according to claim 10, wherein (i) the information regarding the color of the illuminating light for illuminating the object when the image is photographed includes information indicating a spectrum of the illuminating light for illuminating the object, and (ii) the information regarding the color of the illuminating light for illuminating the place for observing the observation image of the object when the object is observed includes information indicating a spectrum of the illuminating light for illuminating the place.

12. An image processing apparatus according to claim 1, wherein the image input apparatus comprises at least one of:

at least one multi-spectrum camera, at least one digital still camera and at least one video camera.

13. An image processing apparatus for processing an image of an object, said apparatus comprising:
   a three-dimensional form recognizing unit which recognizes a three-dimensional form of the object by using image data of the object taken by an image input apparatus, and which outputs object three-dimensional form information regarding the three-dimensional form of the object;
   a specular reflecting component separating unit which separates a specular reflecting component from light reflected from the object in the image of the object, and which then outputs the specular reflecting component;
   an interpolating and composing unit which subjects the image data of the object taken by the image input apparatus to interpolation and composition processing to thereby obtain an image of the object, and which then outputs the obtained image of the object; and
   an observing light form changing unit which converts the image data of the object taken by the image input apparatus into an acquired image in which a form of illuminating light for illuminating the object changed, by using the three-dimensional form information, the specular reflecting component and the image obtained by the interpolation and composition processing, based on a difference between (i) photographing environment information comprising geometric information on a light source for illuminating the object when the object is photographed and (ii) observing environment information comprising information regarding an illumination environment of a place for observing an observation image of the object that is output from an image output apparatus, and which then outputs the acquired image.

14. An image processing apparatus according to claim 13, wherein the image data of the object taken by the image input apparatus comprises a plurality of images of the object taken by the image input apparatus.

15. An image processing apparatus according to claim 14, wherein the plurality of images of the object are obtained by performing an image capturing operation of the image input apparatus a plurality of times under respective conditions which are different with respect to a position of the light source with respect to the object.

16. An image processing apparatus according to claim 14, wherein the plurality of images of the object are obtained by performing an image capturing operation of the image input apparatus a plurality of times under respective conditions which are different with respect to relative positions of the image input apparatus and the object.

17. An image processing apparatus according to claim 16, wherein the plurality of images of the object are obtained by performing the image capturing operation of the image input apparatus a plurality of times, while rotating the object with respect to the image input apparatus.

18. An image processing apparatus according to claim 16, wherein the plurality of images of the object are obtained by performing an image capturing operation of the image input apparatus a plurality of times, while moving the image input apparatus with respect to the object.

19. An image processing apparatus according to claim 14, further comprising an observing light position changing unit which converts the image data of the object taken by the image input apparatus into image data in which the direction of the illuminating light for illuminating the object changed, by using the three-dimensional form information and the specular reflecting component, based on the difference between the photographing environment information and the observing environment information, and which outputs the image data to the observing light form changing unit.

20. An image processing apparatus according to claim 13, further comprising an observing light position changing unit which converts the image data of the object taken by the image input apparatus into image data in which the direction of the illuminating light for illuminating the object changed, by using the three-dimensional form information and the specular reflecting component, based on the difference between the photographing environment information and the observing environment information, and which outputs the image data to the observing light form changing unit.

21. An image processing apparatus according to claim 13, wherein the specular reflecting component separating unit further separates a diffusion reflecting component from the light reflected from the object in the image of the object and outputs the diffusion reflecting component.

22. An image processing apparatus according to claim 13, wherein the photographing environment information further comprises information regarding a color of the illuminating light for illuminating the object when the object is photographed, and the observing environment information further comprises information regarding a color of illuminating light for illuminating the place for observing the observation image of the object when the object is observed.

23. An image processing apparatus according to claim 22, wherein (i) the information regarding the color of the illuminating light for illuminating the object when the image is photographed includes information indicating a spectrum of the illuminating light for illuminating the object, and (ii) the information regarding the color of the illuminating light for illuminating the place for observing the observation image of the object when the object is observed includes information indicating a spectrum of the illuminating light for illuminating the place.

24. An image processing apparatus according to claim 13, wherein the image input apparatus comprises at least one of: at least one multi-spectrum camera, at least one digital still camera and at least one video camera.

25. An image processing method for processing an image of an object, said method comprising:
   recognizing a three-dimensional form information of the object by using image data of the object taken by an image input apparatus;
   separating a specular reflecting component from light reflected from the object in the image of the object, and then outputting the specular reflecting component;
   subjecting the image data of the object taken by the image input apparatus to interpolation and composition processing to thereby obtain an image of the object, and then outputting the obtained image of the object;
   determining a difference between inputted photographing environment information and inputted observing environment information, the photographing environment information comprising geometric information on a light source for illuminating the object when the object is photographed, and the observing environment information including information regarding an illumination environment of a place for observing an observation image of the object that is output from an image output apparatus;
   converting the image data of the object taken by the image input apparatus into an observation-light-position-changed image in which a direction of illuminating light for illuminating the object is changed, by using the three-dimensional form information, the specular reflecting component and the image obtained by the interpolation and composition processing, based on the difference between the photographing environment information and the observing environment information, and then outputting the observation-light-position-changed image;

converting the observation-light-position-changed image into an observation-light-form-changed image in which a form of the illuminating light for illuminating the object is changed, by using the three-dimensional form information, the specular reflecting component and the image obtained by the interpolation and composition processing, based on the difference between the input photographing environment information and observing environment information, and then outputting the observation-light-form-changed image.

* * * * *